United States Patent [19]

Okamoto et al.

[11] 4,365,041

[45] Dec. 21, 1982

[54] RESIN COMPOSITION COMPRISING WATER-SOLUBLE POLYAMIDE AND VINYL ALCOHOL-BASED POLYMER

[75] Inventors: Takashi Okamoto, Osaka; Osamu Doi, Jyoyo, both of Japan

[73] Assignee: Unitika Ltd., Hyogo, Japan

[21] Appl. No.: 258,217

[22] Filed: Apr. 27, 1981

[30] Foreign Application Priority Data

Apr. 26, 1980 [JP] Japan .................................. 55-55944
May 22, 1980 [JP] Japan .................................. 55-68649

[51] Int. Cl.³ ............................................. C08L 77/00
[52] U.S. Cl. ....................................... 525/58; 525/183
[58] Field of Search ......................................... 525/58

[56] References Cited

U.S. PATENT DOCUMENTS

| | | | |
|---|---|---|---|
| 2,299,839 | 10/1942 | McQueen | 525/58 X |
| 2,448,978 | 9/1948 | Hoover | 525/58 |
| 2,456,271 | 12/1948 | Graham | 525/58 |
| 3,355,409 | 11/1967 | Bissot | 525/58 |
| 3,705,207 | 12/1972 | Sills | 525/58 |
| 3,726,945 | 4/1973 | Bottenbuch | 525/58 |
| 3,734,874 | 5/1973 | Kibler | 525/58 |
| 3,779,993 | 12/1973 | Kibler | 525/58 |
| 3,940,469 | 2/1975 | Stiegelmann | 525/58 |
| 4,035,436 | 7/1977 | Matsubara | 525/58 |

FOREIGN PATENT DOCUMENTS

| | | | |
|---|---|---|---|
| 749125 | 4/1970 | Belgium | 525/58 |
| 495698 | 9/1953 | Canada | 525/58 |
| 56-8451 | 1/1981 | Japan | 525/58 |
| 1302177 | 1/1973 | United Kingdom | 525/58 |

*Primary Examiner*—Paul Lieberman
*Attorney, Agent, or Firm*—Sughrue, Mion, Zinn, Macpeak & Seas

[57] ABSTRACT

A resin composition is described consisting essentially of from 0.5 to 100 parts by weight of a water-soluble polyamide and from 0.5 to 100 parts by weight of a vinyl alcohol-based polymer. The resin composition has excellent transparency and can be used, for example, to form light-sensitive resin compositions and adhesives.

21 Claims, No Drawings

RESIN COMPOSITION COMPRISING WATER-SOLUBLE POLYAMIDE AND VINYL ALCOHOL-BASED POLYMER

FIELD OF THE INVENTION

The present invention relates to a resin composition, and more particularly to a resin composition consisting essentially of a water-soluble polyamide and a vinyl alcohol-based polymer.

BACKGROUND OF THE INVENTION

Water-soluble polyamides have long been known, and water-soluble polyamides having various structures have been synthesized. For example, polyamides containing a sulfonic acid group or a salt thereof, polyamides containing an ammonium salt type of nitrogen atom, and polyamides containing an ether bond have been synthesized and used as water-soluble polyamides.

These water-soluble polyamides have excellent abrasion resistance, impact resistance, transparency and the like which are characteristic of polyamides. Furthermore, for the application of the water-soluble polyamides, an inexpensive and nontoxic solvent such as water can be used, and it is not necessary to use organic solvents which may cause environmental or pollution problems. Thus, such polyamides have been used in various applications.

Compositions comprising such water-soluble polyamides, polymerizable vinyl monomers, and sensitizers form light-sensitive resin compositions, and are used as printing materials as described, for example, in Japanese patent publication Nos. 43565/1974, 39846/1976 and 2082/1978. A light-sensitive resin plate is produced by bonding a sheet produced from such a light-sensitive resin composition onto a metal plate or film. When the light-sensitive resin plate is brought into close contact with a developed negative film containing an image pattern and is exposed to light, such as ultraviolet rays, through the negative film, polymerizable vinyl monomers are polymerized and insolublized (also referred to as "cross-linked" or "cured") at exposed areas, whereas at unexposed areas, they remain unpolymerized. Therefore, on washing the light-sensitive resin plate with water, the unexposed areas are dissolved and a resin relief pattern is obtained. In general, resin reliefs produced using such compositions composed mainly of polyamides have excellent abrasion resistance and affinity to ink which are characteristic of polyamides, and thus they have been widely used as printing materials having excellent properties in the filed of printing.

Light-sensitive resin plates produced using the foregoing water-soluble polyamides, however, suffer from several disadvantages. For example, when the light-sensitive resin plate is exposed to light and the unpolymerized areas are removed by washing with water to provide the resin relief pattern, the water penetrates into the polymerized areas, resulting in swelling of the cured areas. Particularly, for lines having a width of about 50μ or less, therefore, deformation of the line, and, in some cases, disappearance of the line, occur. Furthermore, when the resin relief thus obtained is immediately used in printing, printed letters and lines are broader than the originals, that is, extended, because the cured areas are also swollen with water. Additionally, the ability to transfer ink is deteriorated. Thus, in some cases, satisfactory printed letters or lines cannot be obtained. In order to overcome this problem, it is necessary to dry the resin relief at a high temperature for a long period of time. This is not desirable from the viewpoint of efficiency or productivity.

Compositions comprising water-soluble polyamides and reactive compounds, such as melamine resins, urea resins, epoxy compounds, phenol compounds, and methylol compounds, can be used as water-based paints or adhesives. These compositions are cured, e.g., by application of heat. Such cured products, however, are swelled with water when they come into contact with water, even after such curing, as in the case of the light-sensitive resin plate as described above. This leads to a reduction in the performance as a paint or adhesive, and imposes limitations on the usefulness thereof.

Vinyl alcohol-based polymers, such as polyvinyl alcohol and its derivatives which are obtained by partial or full saponification of polyvinyl acetate, have been used as fibers, pastes, adhesives, and so forth.

Light-sensitive resin compositions prepared by mixing such vinyl alcohol-based polymers with polymerizable vinyl monomers and sensitizers have been widely used in the field of printing as in the case of the foregoing light-sensitive polyamide resin compositions. Particularly, in view of the fact that they provide a layer having a high surface hardness, large amounts of light-sensitive resin compositions have been used as materials for the production of pattern plates. Resin plates produced from such resin compositions, however, have a severe disadvantage in that the resin plates exhibit breaking or peeling, particularly during winter months when the temperature and humidity are low, because of poor flexibility and impact resistance.

As is well known in the art, vinyl alcohol-based polymers have also been used heretofore as adhesives. Since the vinyl alcohol-based polymer is not generally easily melted by heat owing to the strong hydrogen bond formed between hydroxyl groups which are contained in the vinyl alcohol-based polymer, it is usually dissolved in water as a solvent to provide an adhesive. The thus-obtained adhesive, however, has the disadvantage that a drying step is required after the coating of the adhesive. This produces problems in operation and imposes limitations on the usefulness.

Recently, in place of organic solvent type of adhesives which have been less employed in view of their toxicity, so-called hot melt type of adhesives having good heat-sealability, such as an ethylene-vinyl acetate copolymer and a polyamide, have been mainly used. These hot melt type of adhesive, however, suffer from several disadvantages. For example, difficulties are encountered in recovering pulp from waste paper which is bonded with these hot melt types of adhesives, because the adhesive such as ethylene-vinyl acetate copolymer and a general polyamide is not soluble in water. Thus, conventional hot melt types of adhesives are limited in their usefulness.

Under such circumstances, adhesives having both water-solubility and hot meltability have been developed. For example, Japanese Patent Publication No. 9611/1974 discloses a water-soluble hot melt type of adhesive wherein a vinyl alcohol-based polymer which is available at low cost is used as a major component and pentaerythritol is mixed therewith. This adhesive, however, has disadvantages in that it is hard and brittle, and has poor flexibility, and that the volatile content at the time of heat-melting is high, resulting in poor heat stability.

Furthermore, Japanese Patent Application (OPI) No. 96831/1976 (The term "OPI" as used herein refers to a "published unexamined Japanese patent application") discloses a composition comprising polyvinyl alcohol and polyethylene glycol, and Japanese Patent Application (OPI) No. 96832/1976 describes that a composition comprising polyvinyl alcohol, an ethylene-vinyl acetate copolymer, and a plasticizer is useful as a water-soluble hot melt type of adhesive. In both compositions, however, polyvinyl alcohol having a low average degree of polymerization and a low degree of saponification, i.e., having many residual acetic acid groups is inevitably used in order to provide both water-solubility and hot melt properties thereto. For example, in Japanese Patent Application (OPI) Nos. 96831/1976 and 96832/1976, polyvinyl alcohol having an average degree of polymerization of 50 to 300 and containing 15 to 70 mol % of residual acetic acid group is used.

In general, the mechanical properties, such as tensile strength, of polyvinyl alcohol is reduced as the average degree of polymerization is lowered and as the amount of residual acetic acid groups is increases.

Adhesives, therefore, as disclosed in Japanese Patent Publication No. 9611/1974, and Japanese Patent Application (OPI) Nos. 96831/1976 and 96832/1976 wherein polyvinyl alcohol having a low average degree of polymerization and a large amount of residual acetic acid group are used have relatively poor adhesion strength. Thus, they are not suitable for use in applications wherein high adhesion strength is required.

In order to overcome the foregoing problems resulting from the use of water-soluble polyamides and vinyl alcohol-based polymers as a base polymer, the following methods may be used:

(1) The water-soluble polyamide or vinyl alcohol-based polymer per se is modified by techniques such as copolymerization and a chemical reaction.
(2) The type and amount of reactive compounds, such as polymerizable vinyl monomers, added to the water-soluble polyamide or vinyl alcohol-based polymer are changed; and
(3) The water-soluble polyamide or vinyl alcohol-based polymer is modified by adding thereto other polymers.

In accordance with Method (1), if it is desired to reduce the swelling properties of the water-soluble polyamide per se, for example, the object can be attained by increasing the crystallinity thereof. In order to increase the crystallinity of the water-soluble polyamide, it is necessary to change the structure of the water-soluble polyamide so that intermolecular hydrogen bonds are easily formed. For this purpose, it is required that the structures of the starting materials for the preparation of the water-soluble polyamide, e.g., dibasic acid, diamine and ω-aminocarboxylic acid, or the copolymerization composition is changed.

This method of increasing the crystallinity of the water-soluble polyamide by changing the structure thereof per se, however, not only reduces the water-solubility of the water-soluble polyamide, which is the greatest feature of the water-soluble polyamide, but also deteriorates the transparency of the water-soluble polyamide. This deterioration of the transparency leads to a reduction in the light-transmission of the water-soluble polyamide, and produces additional problems. For example, when a water-soluble polyamide having poor light-transmission is used as a substrate for a light-sensitive resin, the sensitivity is reduced.

In Method (1), the modification of the vinyl alcohol-based polymer (e.g., the provision of hot-melting properties) can be sometimes achieved by changing the degree of polymerization and degree of saponification of the polyvinyl alcohol, or by copolymerizing with an olefin, such as ethylene, or a vinyl monomer. In this case, however, it is very difficult to achieve the modification while maintaining the balance among the water-solubility, hot-melting properties, and mechanical properties. For example, the provision of hot-melting properties sometimes reduces the water-solubility and mechanical properties.

With regard to Method (2), wherein the type and amount of reactive compounds, such as polymerizable vinyl monomers, added to the water-soluble polyamide or vinyl alcohol-based polymer are changed, various investigations have heretofore been made. However, the type of reactive compounds, such as polymerizable vinyl monomers, which are compatible with water-soluble polyamides or vinyl alcohol-based polymers, is limited and, furthermore, the amount of reactive compounds which can be added is limited from a standpoint of solubility. Therefore, even though the type and amount of reactive compounds are changed within the possible ranges, improvements in the swelling characteristics of the water-soluble polyamide-based composition to water after the curing thereof and in the flexibility of the vinyl alcohol-based polymer composition are still insufficient.

Method (3), i.e., a method in which the water-soluble polyamide or vinyl alcohol-based polymer is modified by adding thereto polymers, has not heretofore received much attention. In performing the modification in accordance with Method (3), when a use for light-sensitive resin composition is considered, it is necessary for the mixture of the water-soluble polyamide or vinyl alcohol-based polymer and other polymers to have a transparency of the same level as that of the water-soluble polyamide or vinyl alcohol-based polymer in view of the light transmission.

Although it is generally believed that polymers having similar chemical structures have compatibility with each other, if a mixture or blend of different polymers is necessary to have transparency, it is required for the different polymers to have sufficient wetting in the interface therebetween to the extent that no scattered light is formed in the interface. It is, therefore, very difficult to presume only from the chemical structure of polymers as to if the blend of the polymers is transparent.

With regard to blends of polyvinyl alcohol and other water-soluble polymers, such as polyethylene glycol, carboxymethyl cellulose, methyl cellulose, hydroxymethyl cellulose, soluble starch, polymethyl acrylate (20% saponified product), and polyethyl acrylate (20% saponified product), the stability in the state of an aqueous solution and the compatibility in the state of a film are described in C. A. Finch Ed., *Polyvinyl alcohol, Properties and Applications,* John Wiley & Sons (1973). However, there can be found no disclosure concerning a blend of polymers which has good compatibility over all mixing ratios and which provides a film having transparency.

SUMMARY OF THE INVENTION

In order to discover a resin composition having excellent water-solubility and transparency which are characteristic of a water-soluble polyamide, mixtures or blends of the water-soluble polyamide and other various water-soluble polymers have been extensively studied.

That is, as the water-soluble polymers, various vinyl alcohol-based polymers exemplified by polyacrylamide, polyacrylic acid and polyvinyl alcohol, methyl cellulose, hydroxyethyl cellulose, carboxymethyl cellulose, a water-soluble urethane resin, soluble starch, etc. were selected. An aqueous solution of such a water-soluble polymer and an aqueous solution (aqueous dispersion) of the water-soluble polyamide were mixed and flow-extended to form a film. The transparency of the film thus formed was then examined.

As a result, it has been found that:
(1) Some of the water-soluble polymers examined have poor compatibility with the water-soluble polyamide; that is, when they are mixed, aggregation occurs, yielding a precipitate and, therefore, difficulty is encountered even in uniformly mixing them;
Even though they appear to be uniformly mixed in the state of an aqueous solution, a film prepared therefrom loses the transparency, and this undesirable phenomenon occurs with almost all of the mixtures examined; but that:
A composition comprising the water-soluble polyamide and a vinyl alcohol-based polymer which has no similarity in chemical structure to the polyamide holds excellent transparency over almost all mixing ratios;
(2) Compounding of a mixture of a water-soluble polyamide and a vinyl alcohol-based polymer with, for example, polymerizable vinyl monomers and sensitizers provides a light-sensitive resin composition which is free from the defects of a light-sensitive resin composition prepared from the water-soluble polyamide or vinyl alcohol-based polymer alone; and
(3) A mixture of a water-soluble polyamide and a vinyl alcohol-based polymer has both water-solubility and hot melt properties, and can provide, for example, a film having excellent adhesive properties, chemical stability under heating conditions, mechanical properties, and flexibility.

The present invention, therefore, provides a resin composition consisting essentially of a water-soluble polyamide and a vinyl alcohol-based polymer in a ratio by weight from about 0.5/100 to 100/0.5.

DETAILED DESCRIPTION OF THE INVENTION

The resin composition of the invention can be used, for example, in the production of water-soluble films and non-fogging films, and as a fiber-treating agent, a paper-treating agent, a modifier for vinyl alcohol-based polymers or polyamides, or as a base material for use in paints, adhesives, inks, light-sensitive resins and the like.

If necessary, various reactive compounds or unreactive compounds, such as surfactants, dyes, and pigments, can be added to the composition of the invention.

When the amount of the water-soluble polyamide added per 100 parts by weight of the vinyl alcohol-based polymer is less than about 0.5 part by weight, the poor flexibility and impact resistance of the vinyl alcohol-based polymer is insufficiently improved. On the other hand, when the amount of the vinyl alcohol-based polymer added per 100 parts by weight of the water-soluble polyamide is less than about 0.5 part by weight, the poor water-swelling resistance of the water-soluble polyamide is not improved to a satisfactory extent. Thus, the weight ratio of the water-soluble polyamide to the vinyl alcohol-based polymer should be within the range of from about 0.5/100 to 100/0.5 and, preferably from 5/100 to 100/5.

Of resin compositions of the invention, those comprising, per 100 parts by weight of the water-soluble polyamide, from about 0.5 to 100 parts by weight of the vinyl alcohol-based polymer provide good abrasion resistance and impact resistance, which are generally characteristic of polyamides, and at the same time, have good water-solubility and transparency.

Compared with water-soluble polyamides alone, the resin composition of the invention provides high tensile strength and stiffness, and low elongation. Furthermore, it can be easily cured with reactive compounds, such as polymerizable vinyl monomers, compared with water-soluble polyamides alone, and the cured product obtained is less swelled with water.

When the amount of the vinyl alcohol-based polymer to be added to the water-soluble polyamide is more than about 100 parts by weight, the abrasion resistance and impact resistance tends to lower. On the other hand, when the amount of the vinyl alcohol-based polymer is less than about 0.5 part by weight, the reactivity of the resulting resin composition with reactive compounds, such as polymerizable vinyl monomers, deteriorates. As a result, undesirably, the swelling properties of the cured product become nearly equal to those of cured products obtained from water-soluble polyamides alone.

Of resin compositions of the invention, those comprising, per 100 parts by weight of the vinyl alcohol-based polymer, from about 0.5 to less than 100 parts by weight of the water-soluble polyamide have water-solubility and transparency and in particular, have excellent heat-sealability.

It has been confirmed that as the amount of the water-soluble polyamide to be added to the vinyl alcohol-based polymer is increased, the tensile strength is lowered and the tensile elongation is increased. Thus, as the amount of the water-soluble polyamide is increased, the flexibility is increased. Therefore, the resin composition of the invention is useful, particularly as a water-soluble hot melt type of adhesive. Furthermore, in view of its excellent transparency, it can be used as an adhesive for use in bonding transparent members in various applications.

When the amount of the water-soluble polyamide to be added to the vinyl alcohol-based polymer is more than about 100 parts by weight, excellent mechanical properties, such as film strength, which the vinyl alcohol-based polymers has inherently, tends to be lowered, and the organic solvent resistance tends to be reduced. On the other hand, when the amount of the water-soluble polyamide resin is less than about 0.5 part by weight, the heat sealability of the resin composition obtained undesirably tends to be lowered.

The term "water-soluble polyamide" as used herein includes both polyamides which are soluble in water and polyamides which can be dispersed in water. Any of such polyamides can be used in the invention. Examples of preferred water-soluble polyamides include polyamides containing a sulfonic acid derivative, such as (a) a sulfonic acid group, (b) a sulfonic acid alkali metal salt, and (c) a salt of a sulfonic acid and at least one amine derivative selected from the group consisting of ammonia, a primary amine, a secondary amine and a tertiary amine; polyamides containing an ammonium salt type of nitrogen atom; and polyamides containing an ether bond.

Examples of polyamides containing a sulfonic acid derivative, such as a sulfonic acid group and its salt, in the molecule include polyamides containing a sulfonic acid or its salt bound to a benzene nucleus or naphthalene nucleus, and polyamides containing sulfonic acid or its salt bound to an aliphatic carbon. Suitable examples of such polyamides include sulfonic acid salt-containing polyamides containing therein a triazine ring as described in Japanese patent publication Nos. 27522/1974 and 27523/1974, U.S. Pat. No. 3,884,702, etc.; and polyamides as described in U.S. Pat. Nos. 3,884,702 which are synthesized from sodium 2,5- or 3,5-dicarboxybenzenesulfonate, sodium 2,5- or 3,5-dicarboxymethylbenzenesulfonate, sodium 2,5- or 3,5-dicarboxymethoxybenzenesulfonate, sodium 2,5- or 3,5-dicarboxymethoxybenzenesulfonate, sodium 2,5- or 3,5-diaminomethylbenzenesulfonate, sodium 2,5- or 3,5-di(β-aminoethyl)benzenesulfonate, sodium α-sulfosuccinate and its dimethyl ester, sodium β-sulfoadipate and its dimethyl ester, α-(γ-sodium sulfopropyl-)amino-ε-caprolactam, etc. by the conventional methods; and polyamides which are synthesized from compounds which are obtained by replacing the sodium of the foregoing compounds by an alkali metal, such as potassium, ammonia, a primary amine, a secondary amine, or a tertiary amine. Usually, polyamides prepared from sodium or potassium 3,5-dicarboxybenzenesulfonate, or from sodium or potassium 3,5-dicarbomethoxybenzenesulfonate (hereinafter, the sodium or potassium 3,5-dicarbonylbenzenesulfonate unit is referred to as "Sip"), which are commercially available, are used. Examples of copolymerization polyamides which can be used include polyamides prepared from hexamethylenediamine and Sip (hereinafter, referred to as "6 Sip"), 6-6 Sip (wherein "6-6 Sip" indicates a copolymer of nylon 6 and 6 and 6 Sip), 6-66-6 Sip (wherein "66" indicates a hexamethylenediammonium adipate unit), 6-6I-6 Sip (wherein "I" indicates an isophthalic acid unit), 6-66 -6I-6 Sip, 6-11-6 Sip G1 (wherein "11" indicates an aminoundecanoic acid unit), 6-12-6 Sip (wherein "12" indicates an aminododecanoic acid unit), 6-610-6 Sip (wherein "610" indicates a hexamethylenediammonium sebacate unit), 6-66-11-6 Sip, 6-66-12-6 Sip, 6-66-610-6 Sip, 6I-6 Sip, 6-6T-6 Sip (wherein T indicates a terephthalic acid unit), 6-PACM.6-6 Sip (PACM indicates 4,4'-diaminodicyclohexylmethane), 6-PACM.I-6 Sip, 6-66-PACM.Sip, 6-66-PACM.6-6 Sip, and 6-66-PACM.I-6 Sip. The preferred Examples of copolymerization polyamides are 6-66-6 Sip, 6-6I-6 Sip and 6-66-6I-6 Sip.

The amount of the sulfonic acid derivative, such as sulfonic acid, contained in the water-soluble polyamide, i.e., the sulfonic acid derivative content, is not critical provided that it permits the polyamide to be soluble in water. It is usually from about 1 to 50 mol % and preferably about 2 to 25 mol %, based on the total mols of the reactants used to produce the polyamide.

The molecular weight of the water-soluble polyamide as used herein is not critical. However, when the molecular weight is very small, the resulting resin composition provides a cured product having less than the desired improvement in swelling properties, whereas when it is very large, the water-solubility of the resin composition is reduced. Thus, the relative viscosity (which is proportional to the molecular weight of the water-soluble polyamide (measured in 96% sulfonic acid at a concentration of 1% and a temperature of 25° C.) is preferably from about 1.2 to 3.5, and more preferably from 1.5 to 3.0.

Examples of polyamides containing an ammonium salt type of nitrogen atom in the molecule include polyamides which are synthesized from, for example, N,N'-bis(carboxymethyl)piperazine, N,N'-bis(carboxymethyl)-2,6-dimethyl piperazine, N,N'-bis(2-carboxyethyl)piperazine, N,N'-bis(3-carboxypropyl)piperazine, N,N-bis(carboxymethyl)methylamine, N,N-bis(2-carboxyethyl)methylamine, N,N-bis(2-carboxyethyl)isopropylamine, N,N'-dimethyl-N,N'-bis(carboxymethyl)ethylenediamine, N,N'-dimethyl-N,N'-bis(2-carboxyethyl)ethylenediamine, N,N'-dimethyl-N,N'-bis(3-carboxypropyl)hexamethylenediamine and their ester derivative, N,N'-di(γ-aminoethyl)piperazine, N-(aminomethyl)-N'(β-aminoethyl)piperazine, and N,N'-bis(γ-aminopentyl)piperazine by the usual method.

Examples of polyamides containing an ether bond in the molecule include polyamides which are synthesized from at least one of dicarboxylic acids, diamines and cyclic amides, all containing an ether bond in the molecule, by the conventional method.

Examples of vinyl alcohol-based polymers to be used in combination with the foregoing water-soluble polyamides include polyvinyl alcohol, which can be obtained by throughly or partially saponifying polyvinyl acetate; water-soluble or water-dispersible polyvinyl alcohol derivatives which are obtained by reacting an —OH group or —OCOCH$_3$ group contained in the throughly or partially saponified polyvinyl alcohol with various compounds, such as an acid anhydride-containing compound, a carboxyl group-containing compound, and an epoxy group-containing compound; and water-soluble or water-dispersible vinyl alcohol-based copolymers which are obtained by copolymerizing vinyl acetate with olefins, such as ethylene, propylene and isobutylene, or with vinyl monomers, such as acrylamide, acrylic acid, methyl acrylate, and maleic anhydride, and by throughly or partially saponifying the resulting copolymers. Preferred examples of vinyl alcohol-based polymers are thoroughly or partially saponified polyvinyl alcohol.

The degree of polymerization of the vinyl alcohol-based polymer is not critical. However, when the degree of polymerication is very small, the swelling properties with respect to water of, for example, a light-sensitive resin plate produced from the resin composition of the invention is not improved to the extent desired. Thus, the degree of polymerization of the vinyl alcohol-based polymer is preferably at least about 50; more preferably at least about 100, still more preferably at least about 300, and most preferably at least 500.

The degree of saponification of the vinyl alcohol-based polymer is not critical, provided that the vinyl alcohol-based polymer is water-soluble or water-dispersible. With regard to polyvinyl alcohol which is obtained by saponifying polyvinyl acetate, the degree of saponification is preferably at least about 50 mol %, more preferably at least about 70 mol % and most preferably at least about 75 mol %.

The resin composition of the invention is prepared by mixing the water-soluble polyamide and vinyl alcohol-based polymer in a medium, such as water and an aqueous solvent. Examples include: a method in which an aqueous solution of the water-soluble polyamide and an aqueous solution of the vinyl alcohol-based polymer are mixed; a method in which the vinyl alcohol-based polymer is added to and mixed with an aqueous solution of the water-soluble polyamide; a method in which the water-soluble polyamide is added to and mixed with an aqueous solution of the vinyl alcohol-based polymer; and a method in which water is added to and mixed with the water-soluble polyamide and the vinyl alcohol-based polymer.

In order to enhance the mixing effect and to shorten the mixing time, it is desirable to heat or stir the mixture. In producing the resin composition of the invention, a so-called aqueous solvent, i.e., a mixture of water and an organic solvent, can be used as the medium.

Organic solvents which can be used in admixture with water include alcohols such as methanol, ethanol, propanol, butanol, ethylene glycol, 1,2-propanediol, 1,3-propanediol, 1,3-butanediol, 1,4-butanediol, 2,3-butanediol, glycerol, diethylene glycol, and cyclohexanol, ketones such as acetone and methyl ethyl ketone, dimethylformamide, dimethylsulfoxide, pyridine, and phenols.

When the water content of the aqueous solvent is low, the stability of the resin composition obtained is poor, and in some cases, the resin composition may separate, thus deteriorating the mixing state of the resin composition. Thus, the water content of the aqueous solvent is usually at least about 60% by weight, and preferably at least about 70% by weight.

The resin composition prepared using water or an aqueous solvent as the medium is molded by, for example, a flow-extension method, an extrusion method, or a press method. On evaporation of the water or aqueous solvent by, for example, heating, a solid molded material can be obtained. Particularly, when it is molded into a film (or sheet), the film has excellent transparency.

The following examples and comparative examples are provided to illustrate the invention in greater detail. All parts are by weight.

EXAMPLES 1 TO 11 AND

Comparative Examples 1 and 2

A mixture of 500 parts of ε-caprolactam, 350 parts of hexamethylene diammonium adipate, 164 parts of dimethyl isophthalate, 125 parts of dimethyl 5-sodium-sulfo isophthalate, 226 parts of a 65% aqueous solution of hexamethylenediamine, and 350 parts of water was placed in an autoclave, heated and stirred at 130° C. for 8 hours under nitrogen atmosphere to remove the methanol formed therefrom and then heated at 270° C. for 5 hours while stirring to obtain a copolymerization polyamide containing therein a sulfonic acid sodium salt. The relative viscosity η rel of a 1% solution of the polyamide in 96% sulfuric acid at 25° C. was 2.23.

To 800 parts of pure water was added 200 parts of the polyamide, and the resulting mixture was stirred at room temperature to obtain a milky aqueous dispersion in which the polyamide was uniformly dispersed.

A 20% aqueous solution of polyvinyl alcohol having a degree of polymerization of 1,700 and a degree of saponification of 99 mol % was prepared. A series of resin compositions were prepared by mixing the aqueous polyamide dispersion and the aqueous polyvinyl alcohol solution so that the weight ratio (solids basis) of water-soluble polyamide to polyvinyl alcohol was 100/5, 100/10, 100/25, 100/50, 100/75, 100/100, 75/100, 50/100, 25/100, 10/100, and 5/100, respectively.

The thus-obtained milky aqueous resin composition was stable, and even when it was allowed to stand at 35° C. for one month, no phase-separation occurred. This aqueous resin composition was flow-extended onto a polyester film and dried with hot air at 100° C. to provide a 30μ thick film. The thus-obtained film had very high transparency. After allowing the film to stand for 24 hours under the conditions of 20° C. and 65 % RH, its tensile strength at break and elongation were measured at a tensile speed of 100 mm/min by the use of a Tensilon tensile testing machine.

For comparison, an aqueous solution of a water-soluble polyamide and an aqueous solution of polyvinyl alcohol were flow-extended and dried in the same manner as described above to form a water-soluble polyamide film and a polyvinyl alcohol film, respectively. The tensile strength and elongation of these films were measured.

The results are shown in Table 1 below.

TABLE 1

| Example | Weight Ratio of Water-Soluble Polyamide to Polyvinyl Alcohol | Strength at Break (Kg/cm$^2$) | Elongation at Break (%) |
|---|---|---|---|
| Example 1 | 5/100 | 780 | 95 |
| Example 2 | 10/100 | 710 | 105 |
| Example 3 | 25/100 | 650 | 130 |
| Example 4 | 50/100 | 495 | 170 |
| Example 5 | 75/100 | 390 | 210 |
| Example 6 | 100/100 | 300 | 296 |
| Example 7 | 100/75 | 215 | 320 |
| Example 8 | 100/50 | 175 | 430 |
| Example 9 | 100/25 | 105 | 560 |
| Example 10 | 100/10 | 95 | 780 |
| Example 11 | 100/5 | 80 | 825 |
| Comparative Example 1 | 100/0 | 70 | 860 |
| Comparative Example 2 | 0/100 | 805 | 90 |

It can be seen from Table 1 that as the weight ratio of water-soluble polyamide to polyvinyl alcohol is increased, the flexibility is increased.

With the films of Examples 4, 6 and 8, and Comparative Examples 1 and 2, the light-transmission in the visible region (wavelength λ=850 to 550 nm) was measured by the use of Double-Beam Spectrophotometer UV-210A, (produced by Shimazu Seisakusho Ltd.). The results are shown in Table 2 below.

TABLE 2

| Example | Light Transmission (%) | | | | Appearance of Film |
|---|---|---|---|---|---|
| | λ = 850nm | λ = 750nm | λ = 650nm | λ = 550nm | |
| Comparative Example 1 | 83 | 80 | 76 | 72 | transparent |
| Example 8 | 87 | 84 | 82 | 77 | " |
| Example 6 | 89 | 89 | 89 | 88 | " |
| Example 4 | 90 | 89 | 89 | 89 | " |
| Comparative Example 2 | 90 | 90 | 90 | 90 | " |

From Table 2 above, it can be seen that compounding polyvinyl alcohol to a water-soluble polyamide increases transparency.

Subsequently, the films as used in Examples 8 to 11 were soaked in water maintained at 50° C. for 8 hours and their water resistance was evaluated. For comparison, a film produced using the water-soluble polyamide alone was prepared, and was subjected to the same water resistance testing as above. The results are shown in Table 3 below.

TABLE 3

| Example | Weight Ratio of Water-Soluble Polyamide to Polyvinyl Alcohol | Evaluation of Water Resistance |
|---------|---|---|
| Comparative Example 1 | 100/0 | Immediately soluble in water when soaked therein. |
| Example 11 | 100/5 | Partial deformation of film, but no complete disappearance. Whitening of film, but shape was maintained. |
| Example 10 | 100/10 | |
| Example 9 | 100/25 | Immediately soluble in water when soaked therein. Partial deformation of film, but no complete disappearance. Whitening of film, but shape was maintained. |
| Example 8 | 100/50 | Immediately soluble in water when soaked therein. Partial deformation of film, but no complete disappearance. Whitening of film, but shape was maintained. |

It can be seen from Table 3 that addition of the polyvinyl alcohol to the water-soluble polyamide increases the water resistance of the film obtained.

It has thus been confirmed that the water-resistance of the film produced using the water-soluble polyamide alone could not be improved by application of heat treatment, but that for the films of Examples 11 to 8, heat treatment (for 2 minutes at 160° C.) further increased the water resistance.

The films obtained in Examples 4 and 5 were each sandwiched between two sheets of brown paper and heat-pressed at 170° C. for 10 seconds. They exhibited good adhesion properties and flexibility. When the bonded brown paper was soaked in water maintained at 30° C. and stirred, the film (i.e., adhesive) was completely dissolved in water. Thus it can be seen that the resin composition of the invention is useful as a water-soluble hot melt type of adhesive.

Comparative Examples 3 to 12

In order to examine the compatibility of a water-soluble polyamine and another water-soluble polymer, a 20 % aqueous solution of the water-soluble polyamide synthesized in Examples 1 to 11 and Comparative Examples 1 and 2 was mixed with a 10 % aqueous solution of the polyacrylamide (Comparative Example 3) in such a manner that the solid content weight ratio of the two aqueous solutions was 1/1. The mixture was then flow-extended and dried in the same manner as described in Examples 1 to 11 to form a film. In the state of the aqueous solution, the phase-separation of the water-soluble polyamide and polyacrylamide did not occur. However, when the mixture was converted into a film, the phase-separation occurred and no transparent film could be obtained.

In the same manner as described above, the compatibility of the water-soluble polyamide and polyethylene glycol (Comparative Example 4), a water-dispersible urethane resin (produced under the trade name of VONDIC 1340 by Dai-Nippon Ink & Chemical Corp.) (Comparative Example 5), and a water-soluble urethane resin (produced under the trade name of HYDRAN HW-140 by Dai-Nippon Ink & Chemical Corp.) (Comparative Example 6) was examined. These water-soluble polymers had compatibility with the water-soluble polyamide in the state of the aqueous solution. However, when the mixtures were converted into a film, the films thus formed had no transparency.

In the case of polyacrylic acid (Comparative Example 7), soluble starch (Comparative Example 8), methyl cellulose (Comparative Example 9), carboxymethyl cellulose (Comparative Example 10), hydroxyethyl cellulose (Comparative Example 11) and a water-soluble phenol resin (produced under the trade name of P-398 by Dai-Nippon Ink & Chemical Corp.) (Comparative Example 12), the phase-separation or aggregation occurred in the state of the aqueous solution and the precipitation was observed to occur.

EXAMPLE 12 AND COMPARATIVE EXAMPLE 13

A mixture of 845 parts of $\epsilon$-caprolactam, 590 parts of hexamethylenediammonium adipate, 218 parts of dimethyl 5-potassium sulfoisophthalate, 132 parts of a 65 % aqueous solution of hexamethylenediamine and 236 parts of water was stirred at 130° C. for 8 hours in a stream of nitrogen and reacted at 270° C. for 5 hours to obtain a sulfonic acid potassium salt-containing copolymerization polyamide. The relative viscosity $\eta$ rel was 2.21.

Subsequently, a mixture of 80 parts of the polyamide as obtained above, 20 parts of polyvinyl alcohol having a degree of polymerization of 1,700 and a degree of saponification of 99 mol %, 30 parts of acrylamide, 5 parts of tri(N-acryloyl)hexahydrotriazine, 4 parts of benzophenone, and 0.1 part of hydroquinone was stirred in 200 parts of a mixed solvent of methanol/water=2/8 (by weight) and dried in a sheet form, and thereafter the sheet thus obtained was pressed at 130° C. by the use of an extender to provide a 0.7 mm thick sheet. This sheet was bonded to a colored tin plate with an epoxy type adhesive to provide a light-sensitive resin plate.

The light-sensitive resin plate was exposed to light through a negative line pattern film by the use of a light exposure apparatus wherein ten 20 W fluorescent lamps were placed in parallel with each other, at a distance of 5 cm for 5 minutes, and unexposed areas were removed by washing with tap water maintained at 30° C. for 2 minutes by the use of a brushing dissolution apparatus. In the relief thus obtained, lines having a line width of 50$\mu$ were completely insolubilized.

For comparison, a light-sensitive resin plate was produced using the water-soluble polyamide alone without the addition of the polyvinyl alcohol in the same manner as above and exposed to light and dissolved under the same conditions as above. Lines having a line width of 50$\mu$ were significantly swelled, and the degree of insolubilization was insufficient to such an extent that the lines were deformed by mere touching with the hand.

EXAMPLE 13 AND COMPARATIVE EXAMPLE 14

Using a mixture of 100 parts of the sulfonic acid sodium salt-containing polyamide as obtained in Examples 1 to 11, 60 parts of polyvinyl alcohol having a degree of polymerization and 550 and a degree of saponification of 80 mol %, 20 parts of N-methylolacrylamide, 30 parts of diethylene glycol diacrylate, 4 parts of uranyl nitrate and 0.2 part of hydroquinone, a light-sensitive resin plate was produced in the same manner as in Example 12. The entire surface of the light-sensitive resin plate was exposed to light for 3 minutes by the use of a 100,000 lux carbon arc lamp placed at a distance of 20 cm, and soaked in water maintained at 23° C. for 30 minutes. The water absorption ratio of the light-sensitive resin plate was 4%.

For comparison, a light-sensitive resin plate was produced in the same manner as above except that the polyvinyl alcohol was not added. The water absorption ratio of the light-sensitive resin plate after irradiation with light was 11 %.

The water absorption ratio was calculated by the following equation:

$$\frac{W - W_O}{W_O} \times 100(\%)$$

wherein W is the weight after soaking in water and $W_O$ is the weight prior to soaking in water.

EXAMPLE 14 AND COMPARATIVE EXAMPLE 15

A mixture of 100 parts of a copolymerization polyamide, which had been prepared by polycondensation of 60 parts of ε-caprolactam and 40 parts of a nylon salt of N,N'-di(γ-aminopropyl)piperazine-adipic acid, 40 parts of polyvinyl alcohol having a degree of polymerization of 1,100 and a degree of saponification of 99 mol %, 10 parts of acrylic acid, 10 parts of β-hydroxyethyl acrylate, 20 parts of ethylene glycol diacrylate, 0.2 part of benzoin methyl ether, and 0.05 part of hydroquinone monomethyl ether was added to 200 parts of a mixed solvent of methanol/water=1/9 (by weight). The resulting mixture was stirred and dried in a sheet form. The thus-obtained sheet was slit and heat-pressed at 130° C. to provide a 0.62 mm thick sheet. The entire surface of the sheet was exposed to light for 3 minutes by the use of a 400 W fluorescent arc lamp placed at a distance of about 5 cm, and then it was soaked in water maintained at 30° C. for 30 minutes. The water absorption ratio was 4.8%.

For comparison, a light-sensitive resin plate was produced in the same manner as above except that the polyvinyl alcohol was not added. The water absorption ratio was 15%.

EXAMPLE 15 AND COMPARATIVE EXAMPLE 16

A mixture of 30 parts of the water-soluble polyamide as obtained in Examples 1 to 11, 70 parts of polyvinyl alcohol having a degree of polymerization of 1,700 and a degree of saponification of 99 mol %, 30 parts of acrylamide, 5 parts of tri(N-acryloyl)hexahydrotriazine, 4 parts of benzophenone and 0.1 part of hydroquinone was added to 200 parts of a mixed solvent of methanol/water=1/9 (by weight). The resulting mixture was stirred and dried in a sheet form. The sheet thus obtained was heat-pressed at 130° C. by the use of an extender to provide a 0.7 mm thick light-sensitive resin plate.

For comparison, a light-sensitive resin plate was produced using the polyvinyl alcohol without the addition of the water-soluble polyamide in the same manner as above.

The entire surface of the light-sensitive resin plate was exposed to light for 5 minutes at a distance of 5 cm by the use of a light exposure apparatus wherein ten 20 W fluorescent lamps were placed in parallel with each other and then cut to strips having a width of 10 cm and a length of 15 cm. According to the bend stiffness testing method (ASTM D790), the strip-like test piece was placed on the support (the distance between the supports was 10 cm) and a predetermined load was applied on the test piece in the center thereof at a predetermined rate. The strain was measured and the flexibility of the light-sensitive resin plate was evaluated. It was confirmed that the addition of the water-soluble polyamide to the polyvinyl alcohol surely increased the flexibility.

EXAMPLE 16 AND COMPARATIVE EXAMPLES 17

Using a mixture of 60 parts of the sulfonic acid sodium salt-containing polyamide as obtained in Examples 1 to 11, 100 parts of polyvinyl alcohol having a degree of polymerization of 550 and a degree of saponification of 80 mol %, 10 parts of N-methylolacrylamide, 40 parts of diethylene glycol diacrylate, 4 parts of uranyl nitrate and 0.2 part of hydroquinone, a 0.7 mm thick light-sensitive resin plate was produced in the same manner as in Example 15.

For comparison, a light-sensitive resin plate was produced in the same manner as above except that the water-soluble polyamide was not added.

The entire surface of the light-sensitive resin plate was exposed to light for 3 minutes at a distance of 2 cm by the use of a 100,000 lux carbon arc lamp and cut into strips having a width of 15 cm and a length of 9 cm. The impact resistance of the strip-like test piece was evaluated by the Izod impact strength testing method (ASTM D256). It was confirmed that the addition of the water-soluble polyamide to the polyvinyl alcohol increased the impact resistance.

EXAMPLE 17

A mixture of 10 parts of the copolymerization polyamide as obtained in Example 14, 90 parts of polyvinyl alcohol having a degree of polymerization of 1,100 and a degree of saponification of 99 mol %, 10 parts of acrylic acid, 10 parts of β-hydroxyethyl acrylate, 20 parts of ethylene glycol diacrylate, 0.2 part of benzoin methyl ether, and 0.05 part of hydroquinone monomethyl ether was added to 200 parts of a mixed solvent of methanol/water=1/9 (by weight). The resulting mixture was stirred and dried in a sheet form. The sheet thus obtained was cut into strips and heat-pressed at 130° C. to provide a 0.65 mm thick light-sensitive resin plate. The entire surface of the light-sensitive resin plate was exposed to light for 3 minutes at a distance of about 5 cm by the use of a 400 W fluorescent arc lamp. The thus-processed resin plate had excellent flexibility.

While the invention has been described in detail and with reference to specific embodiments thereof, it will be apparent to one skilled in the art that various changes and modifications can be made therein without departing from the spirit and scope thereof.

What is claimed is:

1. A resin composition consisting essentially of a water-soluble polyamide and a vinyl alcohol-based polymer in a ratio of from about 0.5/100 to 100/0.5, wherein the water-soluble polyamide contains a sulfonic acid group, a salt of a sulfonic acid group or an ammonium salt type of nitrogen atom and further wherein the linking groups of the water-soluble polyamide are substantially essentially amido bonds.

2. A resin composition as in claim 1 consisting essentially of the water-soluble polyamide and the vinyl alcohol-based polymer in a ratio by weight of from 5/100 to 100/5.

3. A resin composition as in claim 1 or 2, wherein the water-soluble polyamide contains a sulfonic acid group or a salt thereof.

4. A resin composition as in claim 1 or 2, wherein the water-soluble polyamide contains an ammonium salt type of nitrogen atom.

5. A resin composition as in claim 1 or 2, wherein the vinyl alcohol-based polymer is polyvinyl alcohol.

6. A resin composition comprising, per 100 parts by weight of a water-soluble polyamide, from about 0.5 to 100 parts by weight of a vinyl alcohol-based polymer, wherein the water-soluble polyamide contains a sulfonic acid group, a salt of a sulfonic acid group or an ammonium salt type of nitrogen atom and further wherein the linking groups of the water-soluble polyamide are substantially essentially amido bonds.

7. A resin composition comprising, per 100 parts by weight of a vinyl alcohol-based polymer, from about 0.5 to less than 100 parts by weight of a water-soluble polyamide, wherein the water-soluble polyamide contains a sulfonic acid group, a salt of a sulfonic acid group or an ammonium salt type of nitrogen atom and further wherein the linking groups of the water-soluble polyamide are substantially essentially amido bonds.

8. A light-sensitive resin plate including a resin composition consisting essentially of a water-soluble polyamide and a vinyl alcohol-based polymer in a ratio by weight of from about 0.5/100 to 100/05, wherein the water-soluble polyamide contains a sulfonic acid group, a salt of a sulfonic acid group or an ammonium salt type of nitrogen atom and further wherein the linking groups of the water-soluble polyamide are substantially essentially amido bonds.

9. An adhesive material including a resin composition consisting essentially of a water-soluble polyamide and a vinyl alcohol-based polymer in a ratio by weight of from about 0.5/100 to 100/0.5, wherein the water-soluble polyamide contains a sulfonic acid group, a salt of a sulfonic acid group or an ammonium salt type of nitrogen atom and further wherein the linking groups of the water-soluble polyamide are substantially essentially amido bonds.

10. A light-sensitive resin plate as in claim 8 wherein the resin composition comprises, per 100 parts by weight of a water-soluble polyamide, from about 0.5 to 100 parts by weight of a vinyl alcohol-based polymer.

11. A light-sensitive resin plate as in claim 8 wherein the resin composition comprises, per 100 parts by weight of a vinyl alcohol-based polymer, from about 0.5 to less than 100 parts by weight of a water-soluble polyamide.

12. An adhesive material as in claim 9 wherein the resin composition comprises, per 100 parts by weight of a vinyl alcohol-based polymer, from about 0.5 to less than 100 parts by weight of a water-soluble polyamide.

13. A water-soluble hot-melt type of adhesive material wherein the resin composition comprises, per 100 parts by weight of a vinyl alcohol-based polymer, from about 0.5 to less than 100 parts by weight of a water-soluble polyamide, wherein the water-soluble polyamide contains a sulfonic acid group, a salt of a sulfonic acid group or an ammonium salt type of nitrogen atom and further wherein the linking groups of the water-soluble polyamide are substantially essentially amido bonds.

14. A resin composition as in claim 1 or 2 wherein the relative viscosity thereof is from about 1.2 to 3.5.

15. A resin composition as in claim 1 or 2 wherein the relative viscosity thereof is from about 1.5 to 3.0.

16. A resin composition as in claim 1, 2, or 5, wherein the degree of saponification of the vinyl alcohol-based polymer is at least about 50 mol%.

17. A resin composition as in claim 1, 2, or 5, wherein the degree of saponification of the vinyl alcohol-based polymer is at least about 70 mol%.

18. A resin composition as in claim 1, 2, or 5, wherein the degree of saponification of the vinyl alcohol-based polymer is at least about 75 mol %.

19. A resin composition as in claim 1, 2, or 5, wherein the degree of polymerization of the vinyl alcohol-based polymer is at least 50.

20. A resin composition as in claim 1, 2, or 5, wherein the degree of polymerization of the vinyl alcohol-based polymer is at least 100.

21. A resin composition as in claim 1, 2, or 5, wherein the degree of polymerization of the vinyl alcohol-based polymer is at least 300.

* * * * *